Dec. 5, 1961 L. BAUM 3,011,259
GUIDE FIXTURE FOR DENTAL TOOLS
Filed May 7, 1959

INVENTOR.
LLOYD BAUM
BY
Christie, Parker & Hale
ATTORNEYS ered # United States Patent Office 3,011,259
Patented Dec. 5, 1961

3,011,259
GUIDE FIXTURE FOR DENTAL TOOLS
Lloyd Baum, 11460 Aster St., Loma Linda, Calif.
Filed May 7, 1959, Ser. No. 811,705
4 Claims. (Cl. 32—67)

The invention relates to fixtures for guiding dental tools such as drills and grinding implements while such tools are in use in the mouths of patients.

Much work has been done in the field of making more precise the cutting operations which dentists must perform on human teeth. Dependence on the manual dexterity of the individual dentist has given way to reliance on devices which enable dentists of average skill to do precise cutting, drilling and grinding. Such aids to dental skill are exemplified by patents to Jeanneret, No. 2,224,-264, December 10, 1940, and Karlstrom, No. 2,318,403, May 4, 1943. The devices in accordance with these two inventions have aided materially in dental work. However, each invention has drawbacks which the present invention successfully overcomes. The present invention contemplates apparatus for the parallel guidance of dental tools which comprises a movable guide element and a guide frame in which the guide element is movable. The frame is adapted to be secured with respect to the teeth being cut and preferably a tool guide bushing is rigidly held by the movable element perpendicularly to the plane of movement of the element within the frame.

In the preferred embodiment of the invention the movable guide element is a transparent disc which may be of a plastic material. The guide frame is adapted for location in the mouth by means such as quick setting mastics. The guide frame defines a track in which the guide element is movable longitudinally. The track is such that the guide element is also rotatable therein. A tool guide bushing is held within the guide element and extends transversely to the plane of movement of the element within the guide frame. The guide frame is shaped so that its exterior ends may be imbedded within a mastic to adhere in the desired position within an oral cavity.

An alternate embodiment of the guide frame of the invention may have a mounting stand of a relatively flexible material. The stand may then be fixed within the oral cavity in any desired orientation with respect to the teeth. The teeth may then be drilled or otherwise cut either in a labial direction or at any angle of a labial-gingival direction. A transparent disc is preferable. The oral cavity is not well lighted. The transparent disc permits light to pass to the area being worked upon, instead of casting a shadow, thereby aiding the visual perception of the operator.

These and other advantages of the invention are apparent in the following detailed description and drawing in which.

Figure 1:
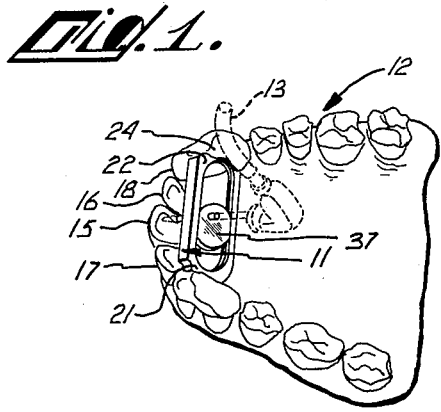
FIG. 1 is a perspective representation of the preferred guide fixture of the invention, fixed to a dentition in operable position.
Figure 2:
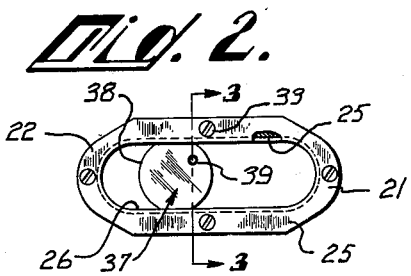
FIG. 2 is a front elevation of the embodiment of the invention of FIG. 1 and partly broken away.
Figure 3:
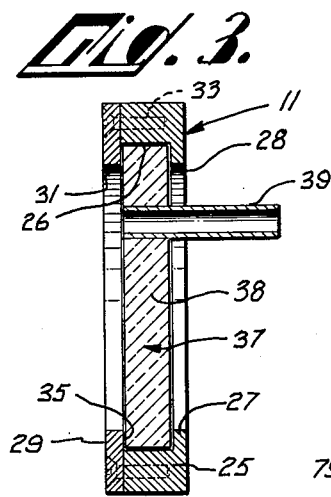
FIG. 3 is a sectional elevation taken along line 3—3 of FIG. 2.

Referring now to FIGS. 1 through 3, a guide fixture shown generally by the reference character 11 is shown in working position with respect to a set 12 of teeth. The fixture is oriented so that a drill tool represented by dotted lines 13 is guided so that holes may be incised transverse to the longitudinal axis of the front teeth 15, 16, 17, 18, or in a labial-gingival direction. The guide frame is held in place at each of its ends 21—22 by a temporary adhesive globule 24.

As shown in more detail in the FIGS. 2 and 3, guide frame 11 is made from a substantially rectangular base 25 having an elongate opening 26. A continuous lip 27 defines a smaller opening 28 concentric with opening 26. A front plate 29 has an opening 31 similar to, but slightly smaller than, opening 26. Front plate 29 is fixed by means such as screws 33 to the base. An inner wall 35 of plate 29 extends inwardly beyond the periphery of opening 26 in the base. Wall 35 and lip 27 form a continuous channel in which a guide element 37 is movable. The guide element comprises a transparent disc 38 in which a sleeve or tubular tool guide 39 is rigidly fixed. The disc may be of plastic or glass.

The guide element is slidable longitudinally of the guide frame in the channel formed by wall 35 and lip 27. This is a planar motion. The guide element is also rotatable within the channel of the guide frame. The sleeve or tool guide is fixed through the disc of the guide element eccentrically with respect to the center of rotation of the disc. Preferably the sleeve is located as close to the periphery of the disc as possible to still clear lip 27 when the disc is rotated within the frame.

With the configuration of apparatus described a drill or other dental tool may be guided against any point on the lingual, incisal or occlusal surfaces of the teeth within an area bounded by the path described by moving the sleeve or tool guide around the channel of the guide frame with the sleeve in closest proximity to lip 27. All holes drilled with the fixture in the orientation shown in FIG. 1 are parallel despite which tooth is drilled.

The fixture may be mounted in almost any position within an oral cavity. It may be tilted with respect to the longitudinal axis of the teeth or may as shown in FIG. 4 be supported so that holes may be drilled or grinding may be done in a plane parallel to the longitudinal axes of the teeth.

Figure 4:
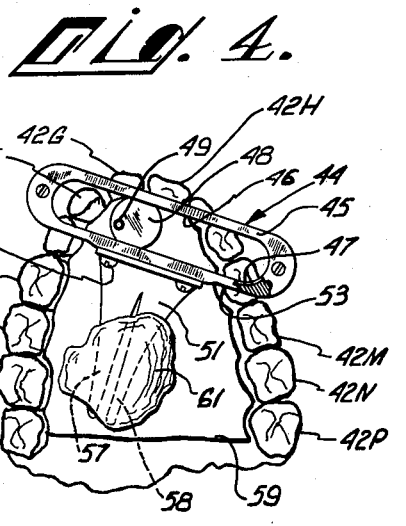
FIG. 4 illustrates an alternate embodiment of the invention held with respect to a dental group.

In FIG. 4 a set of individual teeth 42 through 42P are surmounted by a guide fixture 44. The guide fixture comprises an elongated guide frame 45 having a central opening 46 which is recessed continuously about its inner periphery to form a track 47 for a guide element disc 48. The guide element disc has an eccentrically mounted sleeve 49 protruding therethrough.

A stand 51 is fixed to a long side 53 of the guide frame by means such as screws 55. The stand is of a flexible material such as tin or copper alloy so that it may be twisted to locate the guide frame properly with respect to the teeth.

The stand is substantially L shaped and its end remote from the frame is bifurcated to form feet 57, 58. As illustrated, the bifurcations are temporarily fixed in position on a shaped mount 59 by a globule of adhesive 61. The mount is custom fabricated for each individual application and may be adhered to the dentition or held by an assistant. Because of the malleable character of the material from which the stand is made, the bifurcations and the rest of the stand may be distorted to locate the guide frame and hence the area in which parallel cuts may be made in the desired plane. The stand need not be bifurcated, but may be trifurcated, or have a single foot, depending on its use.

Figure 5:
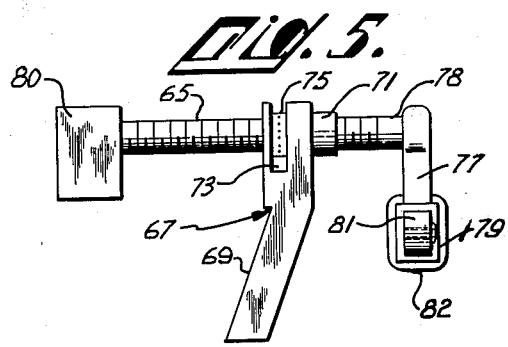
FIG. 5 is a side elevation of a further embodiment of the invention in which a guide bushing is carried by a rotatable arm.
Figure 6:
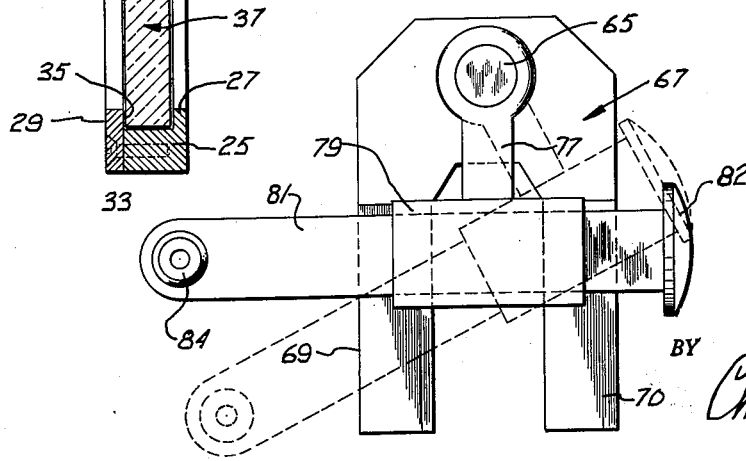
FIG. 6 is an enlarged front elevation of the embodiment of FIG. 5.

In FIGS. 5 and 6 a threaded axle 65 is journalled in a guide frame 67 which has diverging legs 69, 70. A tubular hub 71 projects from one face of the frame. Both legs extend angularly away from the hub. In the frame a slot 73 extends downwardly across the path of the axle. A threaded sleeve nut 75 lodges in the slot in threaded engagement with the axle. Axle extension beyond hub 71 may be adjusted by turning sleeve nut 75 while the axle is held fixed within the frame. The axle turns freely within the frame without changing its extension if the nut is not held.

A small arm 77 is fixed to that end 78 of axle 65 extending beyond the hub. A rectangular track or sleeve 79 is fixed to the end of arm 77 remote from the axle. The arm and sleeve turn in response to a turning moment on a knob 80 fixed to the axle. The opening in the sleeve extends in the plane of rotation of the arm but substantially normal to the radial extent of the arm.

A guide lever 81 is slidably mounted in the sleeve. The lever has a stop 82 at one of its ends which precludes further motion of the lever through the sleeve. The opposite end of the lever has a guide bushing 84 fixed in the lever and extending perpendicularly to the plane of rotation of the arm and the lever. Theoretically, a tool guided by bushing 84 can contact substantially all points within the zone circumscribed by the bushing when rotated about axle 65 at the greatest extent of lever 81 in the sleeve. If a drilling operation is being performed, all holes drilled by means of the fixture are parallel. Straight cuts may be ground by mounting the fixture so that the track or sleeve parallels the projected cut.

Legs 69 and 70 afford means for mounting the fixture in many different orientations with respect to either upper or lower teeth. Conventional adhesives may be used to set the legs in position, and as set forth with respect to the stand of FIG. 4, the fixture is not limited to a device having two legs.

The embodiments of FIG. 1 and FIG. 5 are similar in that each is adapted to be secured in position with respect to the teeth being worked upon by adhesives such as dental impression compound which may be fractured loose at the conclusion of the operation. The embodiment of FIGS. 1 through 3 has the aforementioned end portions 21, 22 which may be imbedded in the positioning adhesive. In FIG. 4 an embodiment utilizes a malleable stand which may be fixed in position with an adhesive. The embodiment of FIGS. 5 and 6 affords legs 69, 70 to which the adhesive adheres.

While two embodiments of the invention have been illustrated, many variations are possible to those skilled in the art without departing from the concept of the invention. The invention provides guide fixtures for dental tools that are accurate, precise, more versatile and which permit more light to reach the critical area being worked upon.

I claim:

1. Apparatus for the parallel guidance of dental tools comprising a guide frame defining an elongated opening in the frame and adapted to be removably secured with respect to teeth being incised, spaced parallel elongated coplanar channels in each of the opposite elongate sides of the guide frame defining the elongated opening, a cylindrical disc guide element disposed in the opening and extending between the channels with diametrically opposed portions of its circumferential periphery disposed in and adjacent to each of the channels in slidable contact therewith, whereby the guide element is slidable and rotatable in the channels in the plane thereof, and a dental tool guide extending through the guide element eccentrically with respect to the center of rotation of the guide element and at a fixed angle to its plane of movement which is adapted to receive a dental tool extended through the guide element and guide it on a thrust line of constant angular relationship to the plane of movement of the guide element.

2. Apparatus for the parallel guidance of dental tools comprising a guide frame adapted to be removably secured with respect to the teeth being incised, an elongated channel on the frame, a rotatable guide element slidable along the channel and a tool guide bushing fixed in the guide element eccentrically with respect to the center of rotation of the guide element, said rotatable guide element comprising a disc of light transmitting material, the tool guide bushing being adapted to guide the tool on a thrust line transversely to the path of movement of the guide element in the channel of the guide frame.

3. Apparatus for the parallel guidance of dental tools comprising a guide frame defining an elongated opening in the frame and adapted to be removably secured with respect to teeth being incised, spaced parallel elongated coplanar guides in each of the opposite elongate sides of the guide frame defining the elongated opening, a cylindrical disc guide element disposed in the opening and extending between the guides with diametrically opposed portions of its circumferential periphery engaging each of the guides in slidable contact therewith, whereby the guide element is slidable and rotatable in the guides in the plane thereof, and a dental tool guide extending through the guide element eccentrically with respect to the center of rotation of the guide element and at a fixed angle to its plane of movement which is adapted to receive a dental tool extended through the guide element and guide it on a thrust line of constant angular relationship to the plane of movement of the guide element.

4. Apparatus for the parallel guidance of dental tools comprising a guide frame defining an elongated opening in the frame and adapted to be removably secured with respect to teeth being incised, spaced parallel elongated coplanar guides in each of the opposite elongate sides of the guide frame defining the elongated opening, a transparent cylindrical disc guide element disposed in the opening and extending between the guides with diametrically opposed portions of its circumferential periphery engaging each of the guides in slidable contact therewith, whereby the guide element is slidable and rotatable in the guides in the plane thereof, and a dental tool guide extending through the guide element eccentrically with respect to the center of rotation of the guide element and at a fixed angle to its plane of movement which is adapted to receive a dental tool extended through the guide element and guide it on a thrust line of constant angular relationship to the plane of movement of the guide element.

References Cited in the file of this patent

UNITED STATES PATENTS

| | | |
|---|---|---|
| 2,224,264 | Jeannert | Dec. 10, 1940 |
| 2,233,722 | Weigele | Mar. 4, 1941 |
| 2,303,475 | Karlstrom | Dec. 1, 1942 |
| 2,318,403 | Karlstrom | May 4, 1943 |